United States Patent [19]

Atkins

[11] 4,263,199

[45] Apr. 21, 1981

[54] POLYESTER MOLDING COMPOSITIONS

[75] Inventor: Kenneth E. Atkins, South Charleston, W. Va.

[73] Assignee: Union Carbide Corporation, New York, N.Y.

[21] Appl. No.: 93,590

[22] Filed: Nov. 13, 1979

[51] Int. Cl.$^3$ .................... C08L 67/00; C08L 67/06
[52] U.S. Cl. ............................ 260/40 R; 525/19; 525/169; 525/170; 525/412
[58] Field of Search ............... 525/169, 412, 170, 19; 260/40 R

[56] References Cited

U.S. PATENT DOCUMENTS

| | | | |
|---|---|---|---|
| 3,489,707 | 1/1970 | Fry | 260/31.6 |
| 3,668,178 | 6/1972 | Comstock et al. | 528/18 |

FOREIGN PATENT DOCUMENTS 1361841  6/1974  United Kingdom ...................... 525/18

*Primary Examiner*—J. Ziegler
*Attorney, Agent, or Firm*—Donald M. Papuga

[57] ABSTRACT

Glass-reinforced polyester molding compositions when mixed with lactone polymers and vinyl chloride polymers as additives afford molding compounds with greater shrinkage control and molded parts with smoother surfaces.

9 Claims, No Drawings

POLYESTER MOLDING COMPOSITIONS

BACKGROUND OF THE INVENTION

This invention pertains to glass-reinforced polyester molding compositions and more particularly to those containing as additives mixtures of lactone polymers and vinyl chloride polymers.

Compositions based on unsaturated polyesters are finding increased use in the automotive industry as compositions from which can be molded fenders, dashboards, and other like component parts of automobiles. As a general rule, these compositions contain in addition to the unsaturated polyesters low-profile additives such as poly(vinyl acetate). A low-profile additive is a material designed to insure that there is no undesirable shrinkage by the composition to which the additive has been added as the composition is being molded into a thermoset article. In other words, low-profile additives have been added to unsaturated polyester compositions which can be molded into thermoset articles the surfaces of which truly reflect the surface characteristics of the mold.

It has been found, however, that although the use of low-profile additives, as described, does effect some degree of improvement in the anti-shrinkage characteristics of the unsaturated polyester compositions, the improvement is more than offset by other problems occasioned by these low-profile additives when the compositions to which they have been added are to be used in sheet-molding applications. Sheet-molding applications involve forming the compositions into sheet material, winding the sheeted material into rolls, allowing the sheeted compositions to thicken and thereafter, as the need arises, unwinding and molding the sheeted material into thermoset articles of desired shape.

A major advance in commercial thermosetting molding technology was the introduction several years ago of chemically thickened systems. Chemical thickening is always employed in sheet molding compounds ("SMC"), and is increasingly being used in bulk molding compounds ("BMC"). In such systems, an alkaline material such as magnesium oxide or magnesium hydroxide is added to, for example, an uncured polyester along with fillers, glass fiber, and other standard materials. The alkaline material interacts with residual acidity in the polyester to build viscosity. The thickened system is relatively tackfree and easy to handle; and the high viscosity carries the glass fiber reinforcement to the extremities of the mold during crosslinking of the system. Thus, the use of thickened systems has made a major contribution to the commercial expansion of polyester molding.

When it is desired to add a thickening agent to the composition of this invention, a wide variety are available and are known to those skilled in the art. These include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of polyester resin, plus monomer, plus low profile additive.

However, not all low-profile additives have afforded satisfactory results.

There has, therefore, been a continuing need for a polyester molding composition which provides better shrinkage control and smoother surfaces to the molded part that have heretofore been available with conventional preparations.

SUMMARY OF THE INVENTION

A glass-reinforced polyester composition, suitable for use in molding applications, containing an unsaturated polyester, an ethylenically unsaturated polymerizable monomer and a low profile additive have been developed with enhanced shrinkage control for imparting smooth surfaces to the molded part by using as the low profile additive a mixture of a carboxyl-containing saturated polyester and a vinyl chloride/vinyl acetate copolymer.

The weight ratio of saturated polyester to vinyl chloride/vinyl acetate copolymer is not narrowly critical but preferably is in the range of from about 10–90 to about 90–10 and even more preferably from about 25–75 to about 75–25. A most preferred ratio is about equal parts by weight of the former to the latter.

The weight percent of this low profile additive in the total polyester molding composition is also not narrowly critical but it is preferred to be about 12 to about 20 weight percent of the total polyester resin; crosslinkable monomer and thermoplastic additive content.

The carboxyl-containing saturated polyesters useful in this invention are preferably either:

1. lactone polyesters having the formula

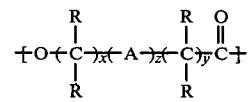

end-capped with phthalic acid groups, wherein each R is hydrogen, halogen, or a monovalent hydrocarbon radical containing a maximum of 12 carbon atoms, A is an oxy group, x and y are each integers having values of 1 to 4 inclusive and z is an integer having a value of 0 or 1 with the provisos that (a) the total sum of x+y+z is 4 to 6 inclusive and (b) the total number of R variables which are substituents other than hydrogen does not exceed 3; or 2. condensation polymers of saturated aliphatic or aromatic dicarboxylic acids, having about 4 to 8 carbon atoms, with saturated aliphatic diols having 2 to about 6 carbon atoms, or ester diols having up to about 10 carbon atoms. Representative dicarboxylic acids include succinic, glutaric, adipic, pimelic, sebacic, o-phthalic, isophthalic, terephthalic and like acids. Representative diols include, ethylene glycol, diethylene glycol, propylene glycol, 1,6-hexanediol, neopentyl glycol and the like. A preferred ester diol is 2,2-dimethyl-3-hydroxypropyl-2,2-dimethyl-3-hydroxypropionate (available commercially as Esterdiol-204 from Union Carbide Corporation).

A description and preparation of these condensation polymers is contained in U.S. Pat. Nos. 3,489,707, 3,736,728 and 3,909,483 which are incorporated by reference.

The lactone polyesters are described in U.S. Pat. No. 3,668,178 also incorporated herein by reference.

It was surprisingly found that a synergistic effect on shrinkage control was obtained when the low profile additive consisted of a carboxyl-containing saturated polyester in combination with a vinyl chloride/vinyl acetate copolymer in a chemically thickened, fiber reinforced unsaturated polyester molding composition. This synergism was even more pronounced when the vinyl chloride/vinyl acetate polymer also contains carboxyl groups.

The unsaturated polyesters useful in this invention are adequately described in U.S. Pat. No. 3,718,714 which is incorporated herein by reference.

Illustrative polymerizable ethylenically unsaturated monomers used in the compositions of this invention are described in U.S. Pat. No. 3,549,586 Column 4, line 48 to Column 5, line 19 which is incorporated herein by reference.

To facilitate the polymerization of the polyester any organic peroxide that functions as a free radical type polymerization initiator can be used to effect curing. Examples of such peroxides are hydroperoxides, as for example, t-butyl hydroperoxide, cumene hydroperoxide, para-menthane hydroperoxide, and the like; peroxy esters, as for example, t-butyl perbenzoate, t-butyl peroctoate and the like; alkyl peroxides, as for example, di-t-butyl peroxide, dibenzyl peroxide and the like; ketone peroxide, as for example, methyl ethyl ketone peroxide, cyclohexanone peroxide, and the like; and acyl peroxide, as for example, benzoyl peroxide, para-chlorobenzoyl peroxide, 2,4-dichlorobenzoyl peroxide, lauroyl peroxide and the like.

Of course, the foregoing curable polyester composition may also contain other ingredients such as suitable fillers. Such fillers are well-known in the art and include by way of example clay, calcium carbonate, silica fillers such as mica, quartz, talc, magnesium silicate and the like, hydrated alumina and the like.

When a filler is employed it is advantageously used in an amount of from about 20 to about 75 percent by weight of the overall composition, i.e., ethylenically unsaturated polyester plus ethylenically unsaturated monomer plus other additives.

The vinyl chloride polymers of this invention include copolymers of vinyl chloride with vinyl esters, such as, vinyl acetate; acrylic or methacrylic esters, such as, methyl acrylate, ethyl methacrylate and the like; acrylonitrile, acrylamide and the like, as well as terpolymers of vinyl chloride where the third component contains at least one carboxyl group.

The preferred vinyl chloride polymer of this invention is a terpolymer of vinyl chloride, vinyl acetate, and maleic acid. A particularly preferred vinyl chloride polymer is the commercially available Bakelite VMCA resin (available from Union Carbide Corporation) with a composition of 81 percent vinyl chloride, 17 percent vinyl acetate, 2 percent maleic acid by weight. Other suitable vinyl chloride polymers include VYHH (Trademark of Union Carbide Corporation for a copolymer containing 86% by weight vinyl chloride and 14% by weight vinyl acetate), VYHD (Trademark of Union Carbide Corporation for a copolymer containing 86% by weight vinyl chloride and 14% by weight vinyl acetate), VYLF (Trademark of Union Carbide Corporation for a copolymer containing 88% by weight vinyl chloride and 12% by weight vinyl acetate), VYNS (Trademark of Union Carbide Corporation for a copolymer containing 90% by weight vinyl chloride and 10% by weight vinyl acetate), VYNW (Trademark of Union Carbide Corporation for a copolymer containing 97% by weight vinyl chloride and 3% by weight vinyl acetate), VAGH (Trademark of Union Carbide Corporation for a copolymer containing 91% by weight vinyl chloride and 3% by weight vinyl acetate), VAGD (Trademark of Union Carbide Corporation for a copolymer containing 91% by weight vinyl chloride and 3% by weight vinyl acetate), VMCH (Trademark of Union Carbide Corporation for a copolymer containing 86% by weight vinyl chloride and 13% by weight vinyl acetate), VMCC (Trademark of Union Carbide Corporation for a copolymer containing 88% by weight vinyl chloride and 16% by weight vinyl acetate), VERR (Trademark of Union Carbide Corporation for a copolymer containing 80% by weight vinyl chloride), VROH (Trademark of Union Carbide Corporation for a copolymer containing 80% by weight vinyl chloride), VYDS (Trademark of Union Carbide Corporation for a copolymer containing 86% by weight vinyl chloride and 14% by weight vinyl acetate), VYNC (Trademark of Union Carbide Corporation for a copolymer containing 58% by weight vinyl chloride and 34% by weight vinyl acetate) and VYDS-66 (Trademark of Union Carbide Corporation for a copolymer containing 86% by weight vinyl chloride and 14% by weight vinyl acetate).

GLASS REINFORCEMENT

SMC glass roving made from continuous filament strand is sized, as in normal glass practice and then at the chopper, the roving breaks up uniformly to insure even distribution of the chopped strands on the resin film. The normal length of the chopped fiber is nominally one inch. Examples of SMC glass currently in use include:

PPG-516; PPG-518; OCF-951; OCF-840; and the like.

BMC glass reinforcement is purchased as a chopped strand, available in ⅛, ¼ (nominally used) and ½ inch cut lengths, after having been made from continuous filament strand and again sized as in normal glass practices. Examples of BMC glass currently in use include:

PPG-3303; PPG-3029; PPG-3197; PPG-3198; OCF-498; OCF-832; and the like.

GENERAL PROCEDURE FOR PREPARATION OF BULK MOLDING COMPOUND (BMC) FORMULATIONS

All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3–5 minutes. The agitator was then stopped and the internal mold release agent was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent was mixed into the paste over a period of 2–3 minutes, the mixer was again stopped and ~175 grams of the paste were removed from the pan (using a large spatula) and transferred to a wide-mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the pan with the mixer running on slow speed. The mixer was run for ~30 seconds after all the glass was in the paste. This short time gave glass wet out without glass degradation. The pan was then removed from the mixer and separate portions of the BMC mix of ~450 grams each were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

GENERAL PROCEDURE FOR PREPARATION OF SHEET MOLDING COMPOUND (SMC) FORMULATIONS

All the liquid components were weighed individually into a 5 gallon open top container placed on a Toledo balance. The contents of the container were then mixed (in a hood) with a high speed Cowles type dissolver. The agitator was started at a slow speed, then increased to medium speed to completely mix the liquids over a period of 2-3 minutes. The mold release agent and/or fatty acid was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2-3 minutes, the mixer was stopped and ~175 grams of the paste was removed from the container and transferred to a wide-mouthed 4 oz. bottle. The paste sample was stored in the capped bottle at room temperature and the viscosity measured periodically using a Model HBT 5X Brookfield Synchro-Lectric Viscometer on a Helipath Stand.

The balance of the paste is next added to the doctor boxes on the SMC machine where it is further combined with fiber glass (~1" fibers). The sheet molding compound (SMC) is then allowed to mature to molding viscosity and then molded into the desired article.

MOLDING FACILITIES

12"×12"×⅛" test panels

Flat panels for MCR surface evaluation are molded on a 75 TON Queens Hydraulic press. The press contains a matched dye set of 12"×12" chrome plated molds. The female cavity is installed in the bottom and the male portion is at the top. Both molds are electrically heated and are controlled on separate circuits so that the molds can be operated at different temperatures For our molding the top and bottom temperature was 300° F. The molding pressure which can be varied from 0-75 TON was run at maximum pressure. The molds do not contain ejector pins; therefore, the molded panel is removed with a rubber suction cup and the use of a stream of air. The panels are laid on a flat surface, weighted to keep them flat and allowed to cool overnight. The molded panel is measured with a micro caliper from corner to corner in all four directions to determine shrinkage which is an average of the four readings. These panels are also used for surface smoothness determinations with the Bendix Profilometer.

HOOD SCOOPS

Hood Scoops designed like miniature automobile hoods and containing a number of ribs and bosses of varying sizes was used to determine "sink", surface smoothness and overall moldability of sheet molding compound formulations containing surface improvers. The hood scoop contains a large triangular boss (1.9" base 3.8" high) and 3 circular bosses (0.4", 0.9", 1.4" diameter). It also contains a number of ribs of varying thickness and with different lead in radii.

Visual observations of these hood scoops as molded and after painting with a glass black paint enables one to compare "sink" over the ribs and bosses, craze cracking, surface smoothness, glass pattern, leaking and overall moldability. The hood scoop mold is installed in a 200 Ton Lawton hydraulic press. The molds contain ejector pins for release of the molded part and are heated with circulating oil. The male core is installed in the bottom of the press and the female cavity at the top. Temperatures of the two molds are controlled separately. Pressure of the press can be varied up to 200 Tons with variable time cycles so that the same part can be molded at several pressures. The speed at which the press closes can also be varied as well as the cure cycle for the molded part. All of these were varied during the molding of SMC formulations containing the surface improvers. Placement of the change pattern on the male core mold was also varied. The molded hood scoop was allowed to cool and was then evaluated.

The invention is further described in the examples which follow. All parts and percentages are by weight unless otherwise specified.

EXAMPLE 1

The following basic formulation was used to demonstrate the synergistic ability of a mixture of a lactone polyester and a vinyl chloride polymer to control shrinkage as compared to the shrinkage control obtained by either alone. Table 1 gives the basic formulation and Table 1A shows the molding composition shrinkage results.

TABLE I

SYNERGISM OF SHRINKAGE CONTROL
BASIC FORMULATION

| Component | Parts by Wt. |
|---|---|
| Unsaturated Polyester Resin (a) | 60 |
| Thermoplastic (as shown below under "Polyester Molding Composition Results") | 14 |
| Styrene (including that used to dissolve the thermoplastic) | 26 |
| Camel Wite | 200 |
| Carbon Black Pigment Dispersion | 13 |
| Zinc Stearate | 4 |
| tert-Butylperbenzoate | 1.0 |
| p-benzoquinone | 0.02 |
| MgO | 0.3-1.0 |
| Glass (¼" fibers) Wt.% | 15 |
| Cure 2'/300° F. and 500 psig | |

(a) Unsaturated polyester resin based on 1.0 mole of isophthalic acid, 3.0 moles of maleic anhydride and 4.4 moles of propylene glycol containing about 35 percent by weight of styrene.

TABLE 1A

POLYESTER MOLDING COMPOSITION RESULTS

| Run No. | Thermoplastic Component | Parts in Formulation | Mold Shrinkage mils/inch |
|---|---|---|---|
| 1 | A | 14 | 1.15 |
| 2 | B | 14 | 2.0 |

TABLE 1A-continued
POLYESTER MOLDING COMPOSITION RESULTS

| Run No. | Thermoplastic Component | Parts in Formulation | Mold Shrinkage mils/inch |
|---|---|---|---|
| 3 | A | 10.5 | 0.0 |
|   | B | 3.5 |  |
| 4 | A | 3.5 | 0.25 |
|   | B | 10.5 |  |
| 5 | A | 7.0 | +0.15 |
|   | B | 7.0 |  |

(A) Poly(ε-caprolactone) end-capped with phthalic anhydride as described in U.S. Pat. No. 3,668,178, column 7, lines 22-35.
(B) Bakelite VMCA resin - a terpolymer containing 81 wt.% vinyl chloride, 17 wt.% vinyl acetate and 2 wt.% maleic acid copolymerized therein.

EXAMPLE 2

Further experiments in a critical shrinkage control formulation were run to describe the structural characteristics necessary to obtain this synergism. The basic formulation used in shown here in Table II and the results are described in Table III.

The materials used are listed below.
LPS-60—a carboxyl containing polycaprolactone
LPS 35—a terpolymer of 81 wt.% vinyl chloride, 17 wt.% vinyl acetate and 2 wt.% of maleic acid
PCL-150—a polycaprolactone polymer containing no carboxyl groups and having the same approximate molecular weight as LPS-60
VYLF—a copolymer of 88 wt.% vinyl chloride and 12 wt.% vinyl acetate containing no carboxyl groups
6-KEA-13—a saturated polyester produced by condensation polymerization of 1.0 mole of adipic acid and 1.05 moles Union Carbide's diol Esterdiol 204. The acid number of the final product was 11.2.

In summary, the following results were obtained.
LPS-60/LPS-35—showed synergism of shrinkage control
LPS-60/VYLF—showed synergism of shrinkage control
PCL-150/LPS-35—did not show synergism of shrinkage control
PCL-150/VYLF—did not show synergism of shrinkage control
6-KEA-13/LPS-35—did show synergism of shrinkage control The conclusion from these experiments is that a saturated polyester containing carboxyl groups when combined with a vinyl chloride polymer (with or without carboxyl groups) yields better shrinkage control than either composition alone.

TABLE II
CRITICAL SHRINKAGE FORMULATION

|  | Parts by Weight |
|---|---|
| Unsaturated Polyester Alkyd | 42.25 |
| Thermoplastic Solids | 10.0 |
| Styrene Monomer | 47.75 |
| Calcium Carbonate (Camel Wite) | 175 |
| Zinc Stearate | 4.0 |
| tert-Butyl perbenzoate | 1.0 |
| p-benzoquinone | 0.02 |
| Modifier M (33% MgO dispersion) | 0.6-3.0 |
| ¼" fiber glass wt.% | 10 |

TABLE III
RESULTS OF TABLE II EXPERIMENTS

| Thermoplastic | Shrinkage mils/inch | Synergism |
|---|---|---|
| LP-60 (PCL-COOH) | 4.50 | — |
| LP-35 (VCl/VAc/MA) | 1.40 | — |
| LP-35/LP-60 (1/1) | 1.25 | Yes |
| LP-60 (PCL-COOH) | 4.50 | — |
| VYLF (VCl/VAc) | 3.19 | — |
| VYLF/LP-60 (1/1) | 2.60 | Yes |
| PCL-150 (PCL-no COOH) | 1.23 | — |
| VYLF (VCl/VAc) | 3.19 | — |
| VYLF/PCL-150 (1/1) | 2.80 | No |
| PCL-150 (PCL-no COOH) | 1.23 | — |
| LP-35 (VCl/VAc/MA) | 1.40 | — |
| LP-35/PCL-150 (1/1) | 1.35 | No |
| 6-KEA-13 (Adipic Acid/ED-204) | 2.20 | — |
| LP-35 (VCl/VAc/MA) | 1.40 | — |
| 6-KEA-13/LP-35 | 1.25 | Yes |

EXAMPLE 3

In the prior art U.S. Pat. No. 3,489,707 Example 3 describes the use of a mixture of a saturated polyester and a vinyl chloride polymer employed in an unthickened mix. Experiments very similar to this Example were run using the formulations shown in Table IV. The saturated polyester used here was Rohm and Haas' G-25 (acid number 0.8) and the polyvinyl chloride was Goodrich's Geon 121. It can be seen from the data obtained and collated in Table IV that no synergism of shrinkage control was observed with these formulations based on the disclosure of U.S. Pat. No. 3,489,707.

TABLE IV
EXPERIMENTS TO COMPARE TO EXAMPLE 3
U.S. Pat. No. 3,489,707

|  | Parts by Weight | | |
|---|---|---|---|
|  | 1 | 2 | 3 |
| Freeman Stypol 40-2955 | 20 | 20 | 20 |
| parabenzoquinone | 0.002 | 0.002 | 0.002 |
| Styrene | 1 | 1 | 1 |
| Rohm & Haas G-25 | 4 | 6 | — |
| t-butyl perbenzoate | 0.40 | 0.40 | 0.40 |
| Geon 121 (PVC) | 1.5 | — | 4.5 |
| Zinc Stearate | 1.5 | 1.5 | 1.5 |
| Calcium Carbonate (Snowflake) | 61.9 | 61.9 | 61.9 |
| ¼" fiber glass | 9.8 | 10.0 | 9.9 |
| Molded at 300° F./3minutes/800 psi | | | |
| Shrinkage (mils/inch) | 0.0 | +0.44 scum | 1.0 |

EXAMPLE 4

In order to show the effectiveness of claimed mixtures in actual SMC formulations versus a standard commercial "zero shrink" grade low profile additive, three runs delineated in Table V were made. These data show that shrinkage control with a mixture of LP-60 and LP-35 is slightly better than that obtained with LP-40A (a 40% solids solution of a carboxyl-containing vinyl acetate polymer in styrene available from Union Carbide Corporation). The unsaturated polyester resin PPG 50270, is a highly reactive isophthalic acid modified resin marketed by PPG. PPG Modifier (RS-5988) is a MgO dispersion in an unsaturated polyester vehicle.

TABLE V

PERFORMANCE OF LP-35/LP-60 BLENDS IN A TYPICAL SMC FORMULATION UTILIZING AN ISOPHTHALIC POLYESTER RESIN

| | PARTS BY WEIGHT | | |
|---|---|---|---|
| RUN NO. | 1 | 2 | 3 |
| PPG 50270 (1) | 60 | 60 | 60 |
| LP-35; 35% Solids LPS-35 in styrene | 20 | 10 | |
| LP-60; 40% Solids LPS-60 in styrene | 17.5 | 26.3 | |
| LP-40A; 40% Solids | | | 30 |
| Styrene | 2.5 | 3.7 | 10 |
| Camel Wite | 150 | 150 | 150 |
| Zinc Stearate | 4 | 4 | 4 |
| tert-Butyl Perbenzoate | 1 | 1 | 1 |
| Marinco H [Mg(OH)₂] Merck & Co. PPG Modifier (RS-5988) | 1.5 | 3 | |
| Glass, PPG 518 1″ chopped | 30 Wt. % ⟶ | | |
| Thermoplastic Ratio (on a solids basis) | 50/50 | 25/75 | 100/0 |
| Shrinkage, mils/inch | +0.25 | +0.35 | 0.17 |

Note:
Total thermoplastic level in all cases was 14%.
(1) High reactivity unsaturated polyester resin supplied by PPG industries.

EXAMPLE 5

Another example showing excellent shrinkage control with a LP-33/LP-60 mixture in a SMC preparation is demonstrated in Table VI, Run 2. Compare this with Run 1 where LP-40A was used. The polyester resin employed was a proprietary flexible resin 3102-5 manufactured by Koppers Co.

TABLE VI

TOUGH SYSTEM FORMULATION SMC PREPARATION

| Run No. | 1 | 2 |
|---|---|---|
| Koppers 3102-5 | 60 | 60 |
| LP-40A, 40% Solids | 35 | — |
| LP-33, 33% Solids(LPS-35 in Styrene) | — | 17.5 |
| LP-60, 40% Solids(LPS-60 in Styrene) | — | 17.5 |
| Styrene | 5 ⟶ | |
| Camel Wite | 150 ⟶ | |
| Zinc Stearate | 4 ⟶ | |
| t-Butyl perbenzoate | 1 ⟶ | |
| MgO, 33% (Modifier M) | 2.5 | 1.25 |
| OCF-951 Glass | 24.7 | 25.4 |
| Ounce Mat Weight | 12.6 | 12.6 |
| Shrinkage, mils/inch | +0.4 | +0.6 |

Molded into 12″ × 12″ × ⅛″ flat panels at 300° F., 3 minutes, 75 tons pressure.

Although the invention has been described in its preferred forms with a certain degree of particularity, it is understood that the present disclosure has been made without departing from the spirit and scope of the invention.

What is claimed is:

1. In a glass-reinforced molding composition containing an unsaturated polyester, a low-profile additive and an ethylenically unsaturated polymerizable monomer suitable for use in molding applications, the improvement wherein the low-profile additive is a combination of a carboxyl-containing saturated polyester and a vinyl chloride/vinyl acetate polymer.

2. The composition claimed in claim 1 wherein the carboxyl-containing saturated polyester is a lactone polyester having repeating units depicted by the formula:

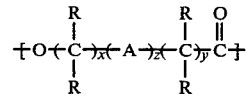

end-capped with phthalic acid groups, wherein each R is hydrogen, halogen, or a monovalent hydrocarbon radical containing a maximum of 12 carbon atoms, A is an oxy group, x and y are each integers having values of 1 to 4 inclusive and z is an integer having a value of 0 or 1 with the proviso that (a) the sum of $x+y+z$ is 4 to 6 inclusive and (b) the total number of R variables which are substituents other than hydrogen does not exceed 3.

3. The composition claimed in claim 2 wherein the carboxyl-containing saturated polyester is a condensation polymer of a saturated aliphatic or aromatic dicarboxylic acid, having about 4 to 8 carbon atoms, with a saturated aliphatic diol having 2 to about 6 carbon atoms, or an ester diol having up to about 10 carbon atoms.

4. The composition claimed in claim 3 wherein the saturated aliphatic acid is adipic and the saturated diol is ethylene glycol.

5. The composition claimed in claim 3 wherein the saturated aromatic dicarboxylic acid is terephthalic acid and the ester diol is 2,2-dimethyl-3-hydroxypropyl-2,2-dimethyl-3-hydroxypropionate.

6. The composition claimed in claim 1 wherein the vinyl chloride polymer is a terpolymer of vinyl chloride, vinyl acetate and maleic acid.

7. The composition claimed in claim 1 wherein the vinyl chloride polymer contains about 17 weight % vinyl acetate and about 2 weight % maleic acid copolymerized therein.

8. Composition claimed in claim 1 containing a thickening amount of a chemically active thickening agent.

9. Composition claimed in claim 8 wherein the thickening agent is magnesium oxide.

* * * * *